United States Patent Office 3,264,301
Patented August 2, 1966

3,264,301
SUBSTITUTED-4-AZASTEROIDS
Norman J. Doorenbos, 211 Regency Circle, North Linthicum, Md., and Kenneth A. Kerridge, Kankakee, Ill. (P.O. Box 12, Bourbonnais, Ill.)
No Drawing. Filed Aug. 22, 1963, Ser. No. 303,955
9 Claims. (Cl. 260—286)

This invention relates to novel 4-azasteroids having a hydrocarbon group at the 3-position and to methods of making them.

It has been found that by subjecting N-loweralkyl-4-aza-3 ketosteroids to the action of metal hydrocarbon compounds, such as the Grignard reagents and the hydrocarbyl lithiums, the hydrocarbon group is substituted at the 3-position and a 2-double bond is formed. The 2,3-unsaturation can be eliminated by hydrogenation with typical hydrogenation catalysts such as platinum dioxide and Raney nickel.

The substitution at the 3-position now appears to be both α- and β-.

The 3-hydrocarbyl-4-azasteroids of the invention inhibit the growth of gram-positive bacteria, yeasts and molds at concentrations in the range of 1 to 100 micrograms per milliliter. Some of the compounds such as 3,4-dimethyl-4-aza-5α-cholestane, 3-ethyl-4-methyl-4-aza-5α-cholestane and 3-benzyl-4-methyl-4-aza-5α-cholestane have shown anti-inflammatory activity in animals.

The following specific examples are illustrative of the compounds and methods of the invention:

*Example 1.—4-methyl-4-aza-5-cholestan-3-one (II)*

To a solution of 15.0 g. of 4-methyl-4-aza-5-cholestan-3-one (I) in 300 ml. of glacial acetic acid, is added 0.75 g. of platinum dioxide. The mixture is hydrogenated at 70° C. and 60 lb. pressure for 8 hours. The solvent is distilled under reduced pressure. The oily material, which is obtained, changes into thick crystalline plates on standing for a few hours; 13.50 g. (86%); M.P. 93–96° C. Fine white crystalline needles are obtained upon recrystallization from acetone-water; 11.50 g. (74%); M.P. 117–119°; $[\alpha]_D^{25°}$ +23°;

$$\lambda_{max.}^{CHCl_3} \; 6.13\mu \; (C=O)$$

*Example 2.—3,4-dimethyl-4-aza-cholest-2-ene (III)*

(a) (In etherbenzene solvent system.) A Grignard reagent is prepared from 0.90 g. of magnesium and 8.32 g. of methyl iodide in 35 ml. of anhydrous diethyl ether using a 500 ml. three-necked flask. The flask is equipped with a stirrer, dropping funnel, and a condenser with a nitrogen delivery tube. Ten grams of (II) in 250 ml. of anhydrous benzene is added dropwise to a rapidly stirred, refluxing solution of the Grignard reagent. After the addition, the solvent is removed by distillation until the refluxing temperature reaches 75° C. The mixture is then refluxed an additional 12 hours. The solution is concentrated to 100 ml., and 200 ml. of 5% aqueous ammonium chloride solution is added cautiously. The mixture is extracted with chloroform (2 x 250 ml.). The combined extracts are washed with distilled water and dried over anhydrous sodium sulfate. A red-brown oil is obtained upon removing the solvent under vacuum. The oil is triturated with 10 ml. of acetone to obtain (III) as an off-white crystalline solid; 7.5 grams (75%), M.P. 259–261° C.

$$\lambda_{max.}^{CHCl_3} \; 6.08\mu \; (C=C)$$

(b) (In ether-dimethyl aniline solvent system.) A Grignard reagent is prepared from 0.90 g. of magnesium and 5.32 g. of methyl iodide in 33 ml. of anhydrous diethyl ether in a 500 ml. three-necked flask. The flask is equipped with a stirrer, dropping funnel, and a condenser with a nitrogen delivery tube. Ten grams of (II), in 250 ml. of purified N,N-dimethylaniline, is added dropwise to a rapidly stirred, refluxing solution of the Grignard reagent. After the addition, solvent is removed by distillation until the reflux temperature reaches 80° C. The mixture is then refluxed an additional 24 hours. Nearly all of the solvent is removed by vacuum distillation and the residue is taken up in 300 ml. of chloroform. To this mixture is added 300 ml. of 3% aqueous hydrochloric acid solution. After thorough mixing, the chloroform layer is separated and washed with another 300 ml. of the 3% hydrochloric acid solution, and then with distilled water. The residue obtained after drying over anhydrous sodium sulfate and removing the solvent may be used in the preparation of 3ε,4-dimethyl-4-aza-5α-cholestane (V) without further purification.

*Example 3.—3,4-dimethyl-4-aza-cholesta-2,5-diene (IV)*

A Grignard reagent is prepared from 0.90 g. of magnesium and 5.32 g. of methyl iodide in 35 ml. of anhydrous diethyl ether in a 500 ml. three-necked flask. The flask is equipped with a stirrer, dropping funnel, and a condenser with a nitrogen gas delivery tube. Ten grams of 4-methyl-4-aza-5-cholesten-3-one (I) in 350 ml. of anhydrous benzene is added, dropwise, to a rapidly stirred, refluxing solution of the Grignard reagent.

After the addition, solvent is removed by distillation until the reflux temperature reaches 75° C. The mixture is then refluxed an additional 12 hours. The solution is concentrated to 100 ml. and 200 ml. of 5% aqueous ammonium chloride solution is cautiously added. The mixture was extracted with chloroform (2 x 230 ml.). The combined extracts are washed with distilled water and dried over anhydrous sodium sulfate. (IV) is obtained as a red-brown oil upon removing the solvent under vacuum.

$$\lambda_{max.}^{CHCl_3} \; 5.95\mu \; (C=C)$$

*Example 4.—3ε,4-dimethyl-4-aza-5α-cholestane (V)*

The crude product (III) obtained in Example 2 is dissolved in 150 ml. of absolute ethanol and treated with hydrogen at 70° C. and 60 lb. pressure 8 hours in the presence of 0.70 g. of platinum dioxide. The mixture is filtered and the solvent removed under vacuum. Crystallization from dilute ethanol yields light, granular white crystals of V; 5.32 g. (53%); M.P. 112–114°. Further crystallizations yielded an analytical sample, M.P. 119–121° C., $[\alpha]_D^{23°}$ +25.80 (c. 0.37 $CHCl_3$).

$$\lambda_{max.}^{CHCl_3}$$

No absorption in unsaturated region (5.5–6.7μ).

Similar results are obtained by hydrogenating 3,4-dimethyl-4-aza-cholest-2,5-diene (IV).

*Example 5.—3ε,4-dimethyl-4-aza-5α-cholestane methiodide (VI)*

One gram of 3ε,4-dimethyl-4-aza-5-cholestane (V) is dissolved in anhydrous ether and treated with 5 grams of methyl iodide. The mixture is allowed to remain at room temperature for one week. A white crystalline precipitate of VI is collected: 1.2 grams (89%); M.P. 248.5–250° C., $[\alpha]_D^{25°}$ + 3.8° (c. 0.33 $CHCl_3$). No absorption is observed in unsaturated region of the infrared spectrum.

*Example 6.—4-ethyl-4-aza-cholest-5-en-3-one (VII)*

Fifty grams of 3,5-seco-4-norcholestan-5-on-3-oic acid is dissolved in 250 ml. of absolute ethanol which has been saturated previously with ethylamine. The resulting solution is heated at 160° C. in a sealed bomb 8 hours. The reaction mixture is left overnight in a refrigerator. A yellowish crystalline product (VII) is collected; 31.0 g. (59%); M.P. 97–100° C. An analytical sample was obtained by an additional crystallization from absolute ethanol and showed M.P. 98–100° C.;

$[\alpha]_D^{25°} -153°$ (c. 1.0 CHCl$_3$)

$\lambda_{max.}^{CHCl_3}$ 6.14μ (C=O), 6.01μ (C=C); $\lambda_{max.}^{EtOH}$ 234μ, log$_e$ 4.16

*Example 7.—4-ethyl-4-aza-5α-cholestan-3-one (VIII)*

To a solution of 20.0 g. of (VII) in 350 ml. of glacial acetic acid is added 1 g. of platinum dioxide. The mixture is hydrogenated at 100° C. and 500 lb. pressure for 9 hours. The solvent is distilled under reduced pressure. The oily residue is crystallized from acetone-water (3:1). Colorless crystalline plates of (VIII) are obtained; 19.00 g. (95%); M.P. 110–111.5° C.;

$[\alpha]_D^{25°} -10°$ (c. 1.0 CHCl$_3$)

$\lambda_{max.}^{CHCl_3}$ 6.15μ (C=O)

*Example 8.—4-ethyl-3-methyl-4-aza-5α-cholest-2-ene (IX)*

A Grignard reagent is prepared from 2.94 g. of magnesium and 17.18 g. of methyl iodide in 50 ml. of anhydrous diethyl ether using a 500 ml. three-necked flask. The flask is equipped with a stirrer, dropping funnel, and a condenser with a nitrogen delivery tube. Ten grams of (VIII) in 300 ml. of anhydrous benzene are added, dropwise, to a rapidly stirred, refluxing solution of the Grignard reagent. After the addition, solvent is removed by distillation until the reflux temperature reaches 75° C. The mixture is then refluxed an additional 27 hours. To this mixture is added 250 ml. of 10% acetic acid to decompose the excess Grignard reagent and complex. The benzene layer is separated, washed with water and dried over anhydrous sodium sulfate. Benzene is removed under reduced pressure to obtain a dark-red gummy product (IX);

$\lambda_{max.}^{CHCl_3}$ 6.05μ (C=C)

which may be used in the preparation of 4-ethyl-3ε-methyl-4-aza-5α-cholestane (X) without further purification.

*Example 9.—4-ethyl-3ε-methyl-4-aza-5α-cholestane (X)*

The crude product obtained in the preparation of IX is dissolved in 200 ml. of absolute ethanol and hydrogenated at 100° C. and 750 lb. pressure for 44 hours in the presence of 1 g. of platinum dioxide. The mixture is filtered and the solvent removed under vacuum, to obtain a yellowish solid; 7.60 g.; M.P. 240–250° C. 1.00 g. of this crude material is dissolved in 20 ml. of absolute ethanol which has previously been treated with hydrogen chloride gas. The solution is allowed to remain overnight and then poured in 50 ml. of 5% sodium hydroxide solution. The mixture thus formed is extracted with diethyl ether. The ether layer is washed with water and dried over anhydrous sodium sulfate. The solvent is distilled under vacuum to obtain a brown gummy material, 0.70 g. A fine, white crystalline product (X) is obtained by crystallizing from ether-ethanol mixture: 0.35 g.; M.P. 93–95° C. An analytical sample obtained by an additional crystallization from absolute ethanol showed: M.P. 94–95° C.; $[\alpha]_D^{25°} +32°$ (c. 1.0 CHCl$_3$);

$\lambda_{max.}^{CHCl_3}$

No absorption in the unsaturated region (5.6–6.7μ).

*Example 10.—4-methyl-3-phenyl-4-aza-cholesta-2,5-diene (XI)*

(a) (With phenylmagnesium bromide.) To an ether solution of phenylmagnesium bromide, prepared from 0.73 g. of magnesium and 4.71 g. of bromobenzene, is added 8.00 g. of 4-methyl-4-aza-5-cholesten-3-one (I). The mixture is refluxed 90 minutes and hydrolyzed with 100 ml. of 5% ammonium chloride solution while cooling in an ice bath. The ether layer is separated and dried over sodium sulfate. The residue obtained after removing the solvent is slurried with 30 ml. of acetone and filtered to yield 4.6 g. (50%) of (XI) as light yellow crystals, M.P. 102–104° C. An analytical sample prepared by crystallizing from ethyl acetate gave M.P. 104–105° C.; $[\alpha]_D -186°$; $\lambda_{max}$ 244–252 mμ, log$_e$ 4.06, 296 mμ, log$_e$ 3.56, 6.07μ and 6.23μ.

(b) (With phenyllithium.) To an ether solution of phenyllithium, prepared from 0.21 g. of lithium and 2.35 g. of bromobenzene, is added 4.00 g. of (I). The mixture is refluxed 90 minutes and worked up by the procedure described above to yield 3.2 g. (70%) of (XI) as white crystals, M.P. 105–106° C. The product was shown to be identical with that prepared by method (a) by mixed M.P. and by comparison of infrared spectra.

*Example 11.—3-ethyl-4-methyl-4-aza-cholesta-2,5-diene (XII)*

(a) (With ethylmagnesium iodide.) To an ether solution of ethylmagnesium iodide, prepared from 0.73 g. of magnesium and 4.7 g. of ethyl iodide, is added 8.00 g. of (I). The mixture is refluxed 90 minutes and hydrolyzed by the addition of 100 ml. of 5% ammonium chloride solution while cooling in an ice bath. The ether layer is separated and dried over sodium sulfate. The residue obtained after removing the solvent is slurried with 30 ml. of acetone and filtered to yield 1.8 g. (22%) of (XII) as pale red crystals, M.P. 85–87° C. An analytical sample obtained as white needles by crystallization from ethyl acetate showed M.P. 87–88° C.; $[\alpha]_D -112°$; $\lambda_{max}$ 271 mμ, log$_e$ 3.95, 5.87μ, and 6.02μ.

(b) (With ethyllithium.) To an ether solution of ethyllithium, prepared from 0.42 g. of lithium and 3.27 g. of ethyl bromide, is added 4.0 g. of (I). The mixture is refluxed 90 minutes and worked up by the procedure described for method (a) to yield 2.2 g. (53%) of (XII) as white crystals, M.P. 86–88°. This product was shown to be identical to the sample prepared by method (a) by mixed M.P. and by comparison of their infrared spectra.

*Example 12.—4-methyl-3-phenyl-4-aza-5α-cholest-2-ene (XIII)*

(a) (With phenylmagnesium bromide.) To a solution of phenylmagnesium bromide, prepared from 0.36 g. of magnesium and 2.35 g. of bromobenzene, is added 4.00 g. of (II). The mixture is refluxed 90 minutes and worked up in the same manner as (XI) to yield 3.0 g. (64%) of (XIII), M.P. 106–108° C. An analytical sample obtained as white needles by crystallization from ethyl acetate showed; M.P. 110–111° C.; $[\alpha]_D -3°$ $\lambda_{max}$ 216 mμ, log$_e$ 4.05, 280 mμ, log$_e$ 3.53; 6.08μ, and 6.23μ.

(b) (With phenyllithium.) Two grams of (II) is reacted with phenyllithium in the same manner as in the preparation of (XI) to yield 1.4 g. (61%) of (XIII), M.P. 108–110° C. The identity of the product with the product obtained by method (a) was confirmed by mixed M.P. and by comparison of infrared spectra.

*Example 13.—3-ethyl-4-methyl-4-aza-5α-cholest-2-ene (XIV)*

(a) (With ethylmagnesium iodide.) To an ether solution of 0.0075 mole of ethylmagnesium iodide is added 2.00 g. of (II). The mixture is refluxed 4 hours and worked up in the same manner as (XII) to yield 800 mg. (38%) of (XIV) as an acetone-insoluble solid, M.P. 60–64° C., and 1.0 g. of the starting material (II), M.P. 114–117° C. An analytical sample of the product obtained as white needles by crystallization from ethyl acetate showed: M.P. 70–71° C.; $[\alpha]_D +3°$; $\lambda_{max}$ 5.88μ and 6.03μ.

(b) (With ethyllithium.) To an ether solution of ethyllithium prepared from 0.21 g. of lithium and 1.63 g. of ethyl bromide, is added 2.0 g. of (II). The mixture is refluxed 90 minutes and worked up in the same manner as above to yield 1.35 g. (65%) of (XIV), M.P. 70–71° C. The identity of this product with the product obtained by method (a) was confirmed by mixed M.P. and by comparison of infrared spectra.

*Example 14.—4-methyl-3ϵphenyl-4-aza-5α-cholestane (XV)*

(a) (By hydrogenation of (XI).) A solution of 600 mg. of (XI) in 250 ml. of ethanol is hydrogenated at room temperature and 45 lb./sq. in. in the presence of 100 mg. of platinum oxide. After 2 hours, the catalyst is filtered and the solvent evaporated to give a white solid, M.P. 151–153° C. Crystallization from ethyl acetate yields 480 mg. (79%) of (XV) as white needles; M.P. 156–157° C.; $[\alpha]_D + 78°$; $\lambda_{max}$ 6.23μ.

Similar results are obtained when 100 mg. of Raney nickel is used as the catalyst.

(b) (Prepared by the hydrogenation of (XIII).) A solution of 600 mg. of (XIII) in 250 ml. of ethanol is hydrogenated at room temperature and 45 lb./sq. in. in the presence of 100 mg. of platinum oxide. After 4 hours, the catalyst is filtered and the solvent evaporated to give a white solid, M.P. 151–153° C. Crystallization from ethyl acetate yields 490 mg. (81%) of (XV) as white needles; 156–157° C. This product was shown to be identical to (XV) prepared by the reduction of (XI) by mixed M.P. and by comparison of infrared spectra.

Similar results are obtained when 100 mg. of Raney nickel is used as the catalyst.

*Example 15.—3ϵ-ethyl-4-methyl-4-aza-5α-cholestane (XVI)*

(a) (By hydrogenation of (XII).) A solution of 600 mg. of (XII) in 250 ml. of ethanol is hydrogenated at 60° and 60 lb./sq. in. in the presence of 100 mg. of platinum oxide. After 2 hours, the catalyst is filtered and the solvent evaporated. The residue is crystallized from ethyl acetate to yield 490 mg. (81%) of (XVI) as white needles, M.P. 105–106° C.; $[\alpha]_D + 46°$; $\lambda_{max}$ no absorption 3.7–6.7μ.

Similar results are obtained when 100 mg. of Raney nickel is used as the catalyst.

(b) (By hydrogenation of (XIV).) A solution of 600 mg. of (XIV) in 250 ml. of ethanol is hydrogenated at 60° and 60 lb. pressure in the presence of 100 mg. of platinum oxide. After 2 hours, the catalyst is filtered and the solvent evaporated. The residue is crystallized from ethyl acetate to yield 510 mg. (84%) of (XVI), M.P. 105–106° C. This product was shown to be identical to (XVI) prepared from (XII) by mixed M.P. and by comparison of infrared spectra.

Similar results are obtained when 100 mg. of Raney nickel is used as the catalyst.

*Example 16.—3ϵ-benzyl-4-methyl-4-aza-5α-cholestane (XVII)*

To the Grignard reagent prepared from 960 mg. of magnesium, 20 ml. of dry ether, and 2.52 g. of benzyl chloride, is added with stirring under nitrogen gas, 4.0 g. of 4-methyl-4-aza-5α-cholestan-3-one (II) dissolved in 20 ml. of toluene. Ether is removed by warming and an additional 20 ml. of toluene is added. The reaction mixture is refluxed 8 hours. A saturated aqueous solution of ammonium chloride was added at 0° C. The organic layer is separated and the aqueous layer is extracted with ether. The combined extracts are washed with water and dried over anhydrous sodium sulfate. Removal of the solvent leaves 4.5 g. of a reddish oil which is sensitive toward air oxidation. The infrared spectrum of this oil shows that it contains some unreacted lactam.

This crude product is dissolved in 150 ml. of 95% ethanol and a drop of 10% hydrochloric acid was added. The solution is treated with hydrogen at 200 lb. pressure and 60° for eight hours in the presence of 0.5 g. of platinum catalyst. The catalyst is filtered and the solution allowed to remain at room temperature for 15 hours. The precipitate which forms is filtered and recrystallized from ethyl acetate to yield 2.1 g. (56%) of (XVII) as white needles, M.P 122–123° C.; $[\alpha]_D^{26} + 45.6°$ (c. 1.0 CHCl$_3$).

*Example 17.—3ϵ-benzyl-4-methyl-4-aza-5α-cholestane methiodide (XVIII)*

A mixture of 22 mg. of (XVII) and 1 ml. of methyl iodide is allowed to remain at room temperature for 15 hours. The mixture is filtered to yield 24 mg. (96%) of (XVIII) as white needles, M.P. 259–260° C.

*Example 18.—20β-hydroxy-4-methyl-4-aza-pregna-5-ene-3-one (XIX)*

To a solution of 0.225 g. of 4-methyl-4-aza-5-pregnene-3,20-dione in 50 ml. of absolute methanol is added 0.06 g. of sodium borohydride. The mixture is refluxed for 30 minutes and the solvent is distilled under vacuum. The solid mass, thus obtained, is treated with 50 ml. of 10% acetic acid and the mixture is extracted with chloroform (2 x 50 ml.). The chloroform layer is washed with water and dried over anhydrous sodium sulfate. The solvent is distilled to obtain a white solid which on crystallization from 95% ethanol yields 0.20 g. of (XIX, M.P. 214–216° C.; $[\alpha]_D^{25} - 108°$ (c. 1.0 CHCl$_3$);

$$\lambda_{max}^{EtOH} 233 \text{ m}\mu, \log_\epsilon 4.13$$

*Example 19.—20β-acetoxy-4-methyl-4-aza-5α-pregnan-3-one (XX)*

To a solution of 4.00 g. of (XIX) in 125 ml. of glacial acetic acid is added 50 mg. of platinum dioxide. The mixture is treated with hydrogen at 70° C. and 70 lb. pressure for eight hours. The catalyst is filtered and the solvent distilled to yield 4.43 g. of a glassy gum. A portion of the gummy mass crystallized from 95% ethanol gave an analytical sample of (XX), M.P. 152–154° C.; $[\alpha]_D^{25} + 41.5°$ (c. 1.0 CHCl$_3$); no absorption at 233 mμ. $\lambda_{KBr}$ 5.77μ (ester) and 6.13μ (lactam).

*Example 20.—20β-hydroxy-4-methyl-4-aza-5α-pregnan-one (XXI)*

Three grams of 20β-acetoxy-4-methyl-4-aza-5α-pregnan-3-one are dissolved in 150 ml. of 95% ethanol containing 10 g. of potassium hydroxide. The solution is refluxed 90 minutes, the solvent distilled and the residue suspended in water and extracted with chloroform. The chloroform extracts are dried over anhydrous sodium sulfate. The solvent is distilled after removing the drying agent to yield 2.76 g. of (XXI) as a white crystalline solid, M.P. 190–198° C. An analytical sample prepared by crystallizing from ethanol showed: M.P. 205–207° C.; $[\alpha]_D^{26} + 29°$ (c. 1.0 CHCl$_3$); no absorption at 5.77μ.

*Example 21.—3ϵ,4-dimethyl-4-aza-5α-pregnan-20β-ol (XXII)*

To a Grignard reagent prepared from 5.47 g. to magnesium and 25.4 g. of methyl iodide in 50 ml. of anhydrous ether is added fifteen grams of (XXI), dissolved in 350 ml. of purified N,N-dimethylaniline. After the addition, solvent is removed until the reflux temperature reaches 80° C. The mixture is refluxed 24 hours and then concentrated to 75 ml. under reduced pressure. Hydrochloric acid (250 ml. of 3%) is added and the mixture extracted with chloroform and dried over anhydrous sodium sulfate. A dark red syrup is obtained after removal of the solvent. Trituration with diethyl ether yields a red-brown gelatinous solid which is sensitive to air oxidation.

This crude product is dissolved in absolute ethanol and treated with hydrogen for eight hours at 70° C. and 70 lbs. pressure in the presence of 1.0 g. of platinum catalyst. The solvent is removed under reduced pressure after filtering the catalyst. The crude product, a reddish-brown gummy mass, is purified by trituration with hot acetonitrile. The triturates deposit (XXII) as a light tan powder, M.P. 110–116° C.; $[\alpha]_D^{25}$ −185° (c. 1.0 $CHCl_3$); ultraviolet and infrared spectra indicate the absence of C=C, C=O, and C=N.

We claim:
1. 3,4-dimethyl-4-aza-5α-cholest-2-ene.
2. 3,4-dimethyl-4-aza-5α-cholestane.
3. 4-ethyl-3-methyl-4-aza-5α-cholest-2-ene.
4. 4-ethyl-3-methyl-4-aza-5α-cholestane.
5. 3-ethyl-4-methyl-4-aza-5α-cholest-2-ene.
6. 3-ethyl-4-methyl-4-aza-5α-1cholestane.
7. 3-benzyl-4-methyl-4-aza-5α-cholestane.
8. 3-benzyl-4-methyl-4-aza-5α-cholestane methiodide.
9. Compounds of the group consisting of 4-loweralkyl-4-azasteroids having a lower alkyl, monocarbocyclic aryl or monocarbocyclic aralkyl group in the 3-position, and the quarternary ammonium salts thereof.

References Cited by the Examiner

FOREIGN PATENTS 863,662  3/1961  Great Britain.

OTHER REFERENCES

Beyler et al., J. Am. Chem. Soc., vol. 82, p. 174 (1960).
Encyclopedia of Polymer Science and Technology, vol. I, pp. 643–6, (1964).
Fieser et al., Advanced Organic Chemistry, Reinhold, 1961, p. 273.

ALEX MAZEL, *Primary Examiner.*

NICHOLAS S. RIZZO, HENRY R. JILES, *Examiners.*

DONALD G. DAUS, *Assistant Examiner.*